United States Patent
Nishiyama et al.

(10) Patent No.: US 7,454,062 B2
(45) Date of Patent: Nov. 18, 2008

(54) APPARATUS AND METHOD OF PATTERN RECOGNITION

(75) Inventors: Masashi Nishiyama, Kanagawa (JP);
Osamu Yamaguchi, Kanagawa (JP);
Kazuhiro Fukui, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 560 days.

(21) Appl. No.: 10/980,310

(22) Filed: Nov. 4, 2004

(65) Prior Publication Data
US 2005/0141767 A1 Jun. 30, 2005

(30) Foreign Application Priority Data
Nov. 5, 2003 (JP) ............................. 2003-376267

(51) Int. Cl.
*G06K 9/00* (2006.01)
(52) U.S. Cl. ...................................... 382/181; 382/118
(58) Field of Classification Search ........................ None
See application file for complete search history.

(56) References Cited

U.S. PATENT DOCUMENTS 5,164,992 A * 11/1992 Turk et al. .................. 382/118
5,982,912 A 11/1999 Fukui et al.
6,466,685 B1 * 10/2002 Fukui et al. ................. 382/115
2003/0161537 A1 8/2003 Maeda et al.
2003/0198366 A1 10/2003 Fukui et al.
2003/0215115 A1 * 11/2003 Kim et al. ................... 382/118

OTHER PUBLICATIONS

Iwanami, "Suite Iryowokumiawaseru", Toukeigakunofurontexia 6, Chap3, 2003, pp. 141-143.

* cited by examiner

*Primary Examiner*—Matthew C Bella
*Assistant Examiner*—Alex Liew
(74) *Attorney, Agent, or Firm*—Oblon, Spivak, McClelland, Maier & Neustadt, P.C.

(57) ABSTRACT

In one embodiment of the invention, a pattern recognition apparatus comprises a unit for inputting a pattern of a to-be recognized category; and a processor with a memory for: generating input subspace; calculating and storing reference subspaces; storing constraint subspaces for extracting features; projecting the input subspace and the reference subspaces respectively onto the constraint subspaces; calculating similarities between the respective reference subspaces and the input subspace in such projected state; combining the similarities in respect of the constraint subspaces on each of the reference subspaces; and identifying the to-be recognized category with a category corresponding to one of the reference subspaces, if the combined similarity between the one of reference subspace and the input subspace is highest among them.

18 Claims, 12 Drawing Sheets

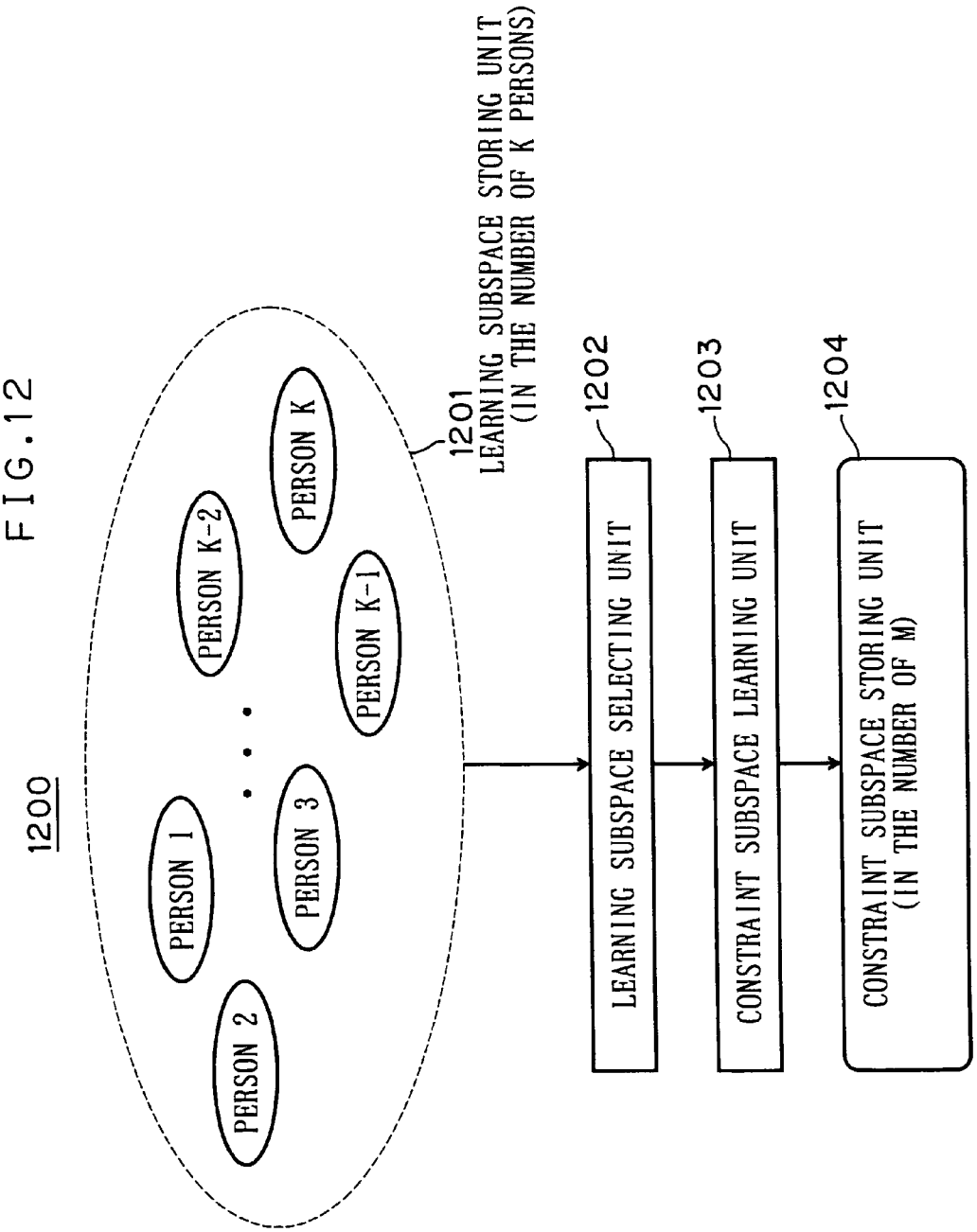

APPARATUS AND METHOD OF PATTERN RECOGNITION

CROSS-REFERENCE TO RELATED APPLICATIONS

This application is based upon and claims the benefit of priority from the prior Japanese Patent Application No. 2003-376267, filed on Nov. 5, 2003; the entire contents of which are incorporated herein by reference.

BACKGROUND OF THE INVENTION

This invention relates to an art that extracts effective features for the pattern recognition, and thereby carries out stably the pattern recognition.

The pattern recognition art that determines a category of the unknown pattern is needed in various fields. As one of the pattern recognition art, Watanabe et al (S. Watanabe, N. Pakvasa, Subspace method of pattern recognition, Proc. 1st Int. J. Conf. on Pattern Recognition, 1973) propose the subspace method. The subspace method is advantageous in that feature extraction and classification can be executed at the same time and extension is easy from two categories to a plurality of categories. In the subspace method, a similarity is determined by angle between an input vector converted from an unknown pattern and a reference subspace. The reference subspace is generated by the principal component analysis from a previously obtained vector of one category. When the similarity is equal to or greater than a threshold, the input vector can be determined the category.

JP-A-11(1999)-265452 and Maeda et al (K. Maeda, T. Watanabe, A Pattern Matching Method with Local Structure, IEICE Trans. D-II Vol. J68-D, No. 3, 345-352, 1985) propose the mutual subspace method which determines similarity by angle between the input subspace and the reference subspace. The mutual subspace method is more robust against pattern variations and noise because of using an input subspace instead of an input vector. The similarity S between subspace P and subspace Q is calculated by the following equation.

$$S = \cos^2 \theta \quad (1)$$

where $\theta$ represents the angle between P and Q. This angle is called canonical angle.

If two subspaces are equal, then $\theta=0$. Described in JP-A-11(1999)-265452 cited before, $\cos^2 \theta$ is obtained by determining a maximum eigenvalue of the following matrix X.

$$Xa = \lambda a \quad (2)$$

$$X = (x_{ij}), (i, j = 1 \sim N) \quad (3)$$

$$(x_{ij}) = \sum_{1 \le k \le N} (\psi_i, \phi_k)(\phi_k, \psi_j) \quad (4)$$

where $\psi_i$ represents an i-th basic vector on the subspace P. $\phi_j$ represents an j-th basic vector on the subspace Q. N represents the number of dimensions of the subspace.

Furthermore, in order to enhance the recognition accuracy for the mutual subspace method, JP-A-2000-30065 and Fukui et al (K. Fukui, O. Yamaguchi, K. Suzuki, K. Maeda, Face Recognition under Variable Lighting Condition with Constrained Mutual Subspace Method—Learning of Constraint Subspace to Reduce Influence of Lighting Changes—, IEICE Trans. D-II Vol. J82-D-II, No. 4, 613-620, 1999) propose the constrained mutual subspace method. This technique is that the input subspace and the reference subspace are projected onto a constraint subspace for emphasizing extra-category variation which is considered effective for the pattern recognition. The similarity $S_c$ under the constrained mutual subspace method, determined by an angle $\theta_c$ between subspace $P_c$ and subspace $Q_c$ which are projected onto a constraint subspace C (Equation (5)).

$$S_C = \cos^2 \theta_C \quad (5)$$

The procedure of projection onto a constraint subspace is detailed in JP-A-2000-30065 and Maeda et al cited on p.2. The procedure of generating a constraint subspace is described in the JP-A-2000-30065.

When the constraint subspace is used for the pattern recognition, recognition performance becomes unstable because the similarity of a certain category becomes low. If the constraint subspace is changed, the similarity of another category becomes low. For example on the face image recognition system, the person who is occurred with such problem is prone to higher false rejection rate than other persons.

SUMMARY OF THE INVENTION

Therefore, the present invention proposes a method of using a plurality of constraint subspaces for the pattern recognition. By using a plurality of constraint subspaces, the influence of the above problem is diminished. It is expected to decrease the false rejection rate greatly.

Therefore, the present invention provides a pattern recognition apparatus capable of carrying out stable pattern recognition, and a method for the same.

According to one embodiment of the present invention, a pattern recognition apparatus comprises: a unit for inputting at least two input patterns; and a processor with a memory for; generating an input subspace from the input patterns; storing reference subspaces which are generated from reference patterns; storing a plurality of constraint subspaces for extracting an effective feature for pattern recognition; projecting the input subspace and the reference subspaces onto each one of the constraint subspaces; calculating similarities between thus projected input subspace and thus projected reference subspaces, on the each one of constraint subspaces; combining the similarities obtained by using the plurality of constraint subspaces, as to find a combined similarity between the input subspace and each of the reference subspaces; and determining a category of the input subspace by comparing the combined similarities.

Such construction enables correct pattern recognition in respect of the category of input subspace by using a plurality of constraint subspaces.

According to another embodiment of the present invention, a pattern recognition apparatus comprises: a unit for inputting an input pattern; and a processor with a memory for; generating an input vector from the input pattern; storing reference subspaces which are generated from reference patterns; storing a plurality of constraint subspaces for extracting an effective feature for pattern recognition; projecting the input vector and the reference subspaces onto each one of the constraint subspaces; calculating similarities between thus projected input vector and thus projected reference subspaces, on the each one of constraint subspaces; combining the similarities obtained by using the plurality of constraint subspaces, as to find a combined similarity between the input vector and each of the reference subspaces; and determining a category of the input subspace by comparing the combined similarities.

Such construction enables correct pattern recognition in respect of the category of input vector by using a plurality of constraint subspaces.

By the above embodiments, the pattern recognition is stably executed by utilizing a plurality of feature extractions in order to obtain effective information for the pattern recognition.

BRIEF DESCRIPTION OF THE DRAWINGS

FIG. 12 is a configuration diagram of a constraint subspaces learning device 1200.

DETAILED DESCRIPTION OF THE INVENTION

The present invention provides a method of using a plurality of constraint subspaces and a learning method of constraint subspaces from learning patterns. These methods are a technical idea proposed for the first time in the present invention. This is newly termed as a "multiple constrained mutual subspace method". Concerning this, descriptions of using a plurality of constraint subspaces are made in the following first to fourth embodiments. The learning method of constraint subspaces will be described in the fifth and sixth embodiments.

First Embodiment

In method of using a plurality of constraint subspaces, a similarity combining is needed. The similarity combining methods are divided into two, depending upon whether to combining those based on a fixed weight, or to combining those based on a dynamic weight. At first, the former method of recognition is described as a first embodiment.

Figure 1:
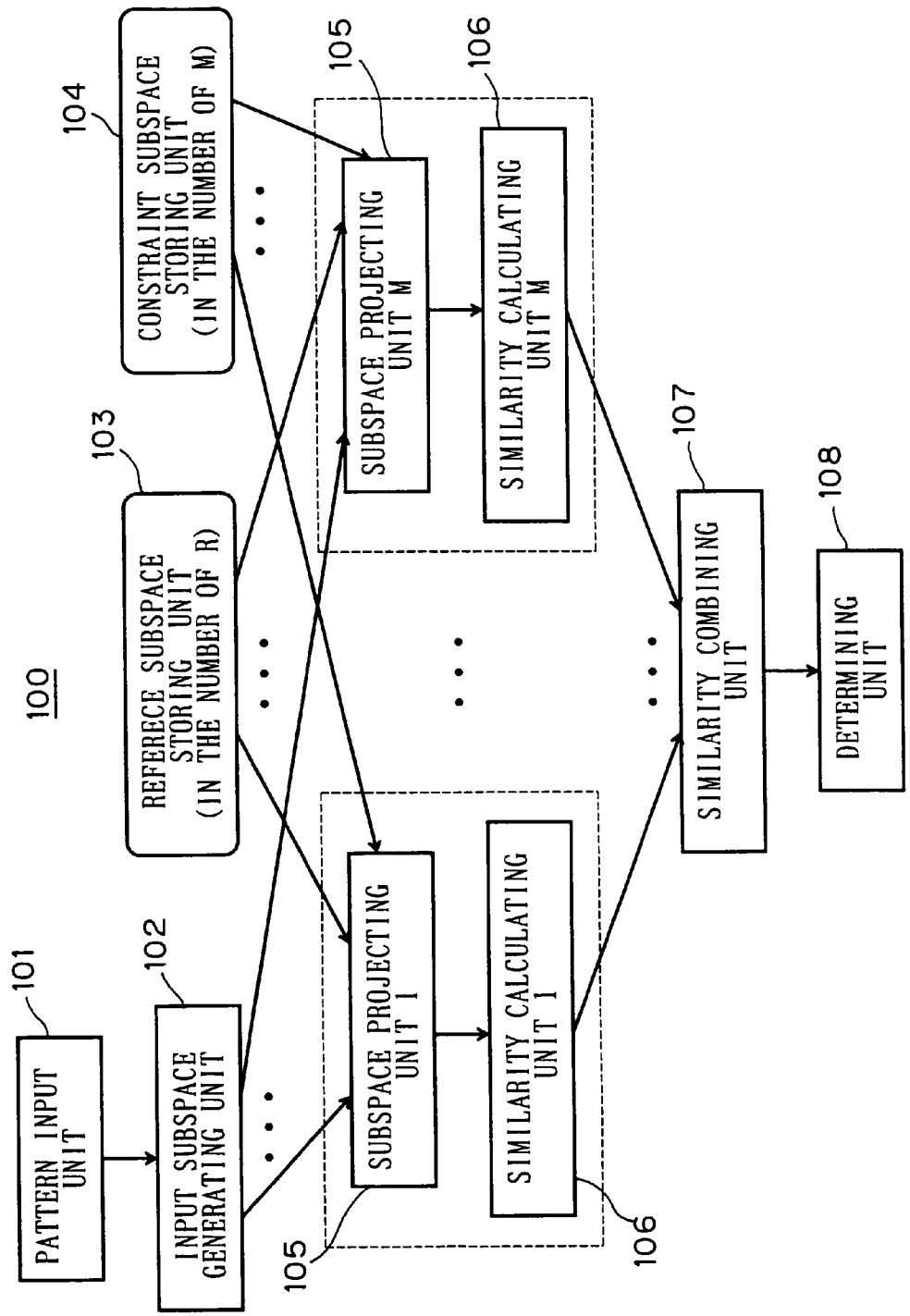
FIG. 1 is a configuration diagram of a pattern recognition apparatus 100.

The present embodiment is shown as a pattern recognition apparatus 100 in FIG. 1. The pattern recognition apparatus 100 comprises a pattern input unit 101, an input subspace generating unit 102, a reference subspace storing unit 103, a constraint subspace storing unit 104, a subspace projecting unit 105, a similarity calculating unit 106, a similarity combining unit 107, and a determining unit 108. Incidentally, the subspace projecting unit 105-1, ..., 105-M and the similarity calculating unit 106-1, ..., 106-M each exist in the number of M of the constraint subspaces stored in the constraint subspace storing unit 104. Meanwhile, the units 101-108 are to be realized by a program stored on a computer.

(1) Pattern Input Unit 101

The pattern input unit 101 acquires patterns of an unknown category, and stores it to a memory after conversion into a feature vector. Pattern acquisition maybe at all times. Note that the "pattern" refers to physical information capable of specifying a category, which includes face image, fingerprints, voice, characters and DNA.

(2) Input Subspace Generating Unit 102

The input subspace generating unit 102, when feature vectors are acquired in a predefined number, generates an input subspace based on principal component analysis.

(3) Reference Subspace Storing Unit 103

The reference subspace storing unit 103 stores in the number R of reference subspaces which are generated by the principal component analysis.

(4) Subspace Projecting Units 105-1, ..., 105-M

Each of the subspace projecting units 105 projects the input subspace and reference subspaces stored in the reference subspace storing unit 103, onto one of the constraint subspaces stored in the constraint subspace storing unit 104. The procedure of projection is detailed in JP-A-2000-30065 and Maeda et al cited on p. 2.

(5) Similarity Calculating Units 106-1, ..., 106-M

Each of the similarity calculating unit 106 calculates similarities between the reference subspaces and the input subspace in a state having been projected onto one of the constraint subspaces, by the mutual subspace method.

(6) Similarity Combining Unit 107

The similarity combining unit 107 takes an average value, maximum value, minimum value or median value from a plurality of similarities obtained by using constraint subspaces (hereinafter, referred to as a combined similarity)

In this description, calculating an average, etc. of similarities for each reference subspace is referred to as "combining".

When the combining is made by taking the average value, a similarity $S_E$ is determined by Equation (6).

$$S_E = \frac{1}{M} \sum_{1 \leq i \leq M} \cos^2 \theta_{C_i} \quad (6)$$

where M represents the number of constraint subspaces, and $\theta_{ci}$ represents an angle between $P_{ci}$ and $Q_{ci}$ which are the subspace P, Q projected onto a constraint subspace $C_i$. Meanwhile, when the combining is made by taking a maximum value, a minimum value or a median value, the similarities $S_E$ can be respectively determined by the following equation.

$$S_E = \max\{\cos^2 \theta_{C_1} \ldots, \cos^2 \theta_{C_M}\} \quad (7)$$

$$S_E = \min\{\cos^2 \theta_{C_1} \ldots, \cos^2 \theta_{C_M}\} \quad (8)$$

$$S_E = \mathrm{median}\{\cos^2 \theta_{C_1} \ldots, \cos^2 \theta_{C_M}\} \quad (9)$$

Besides, there is a method that, after selecting candidates by the constrained mutual subspace method using each constraint subspaces, category is finally determined by decision-by-majority or logical sum from the candidates.

Incidentally, combining the similarities is carried out by the number R of the reference subspaces stored in the reference subspace storing unit 103. Each combined similarity represents a similarity between the reference subspace and the input subspace.

(7) Determining Unit 108

The determining unit 108 determines the category of the input subspace from the combined similarity which is the highest value and greater than a preset threshold.

Second Embodiment

Figure 2:
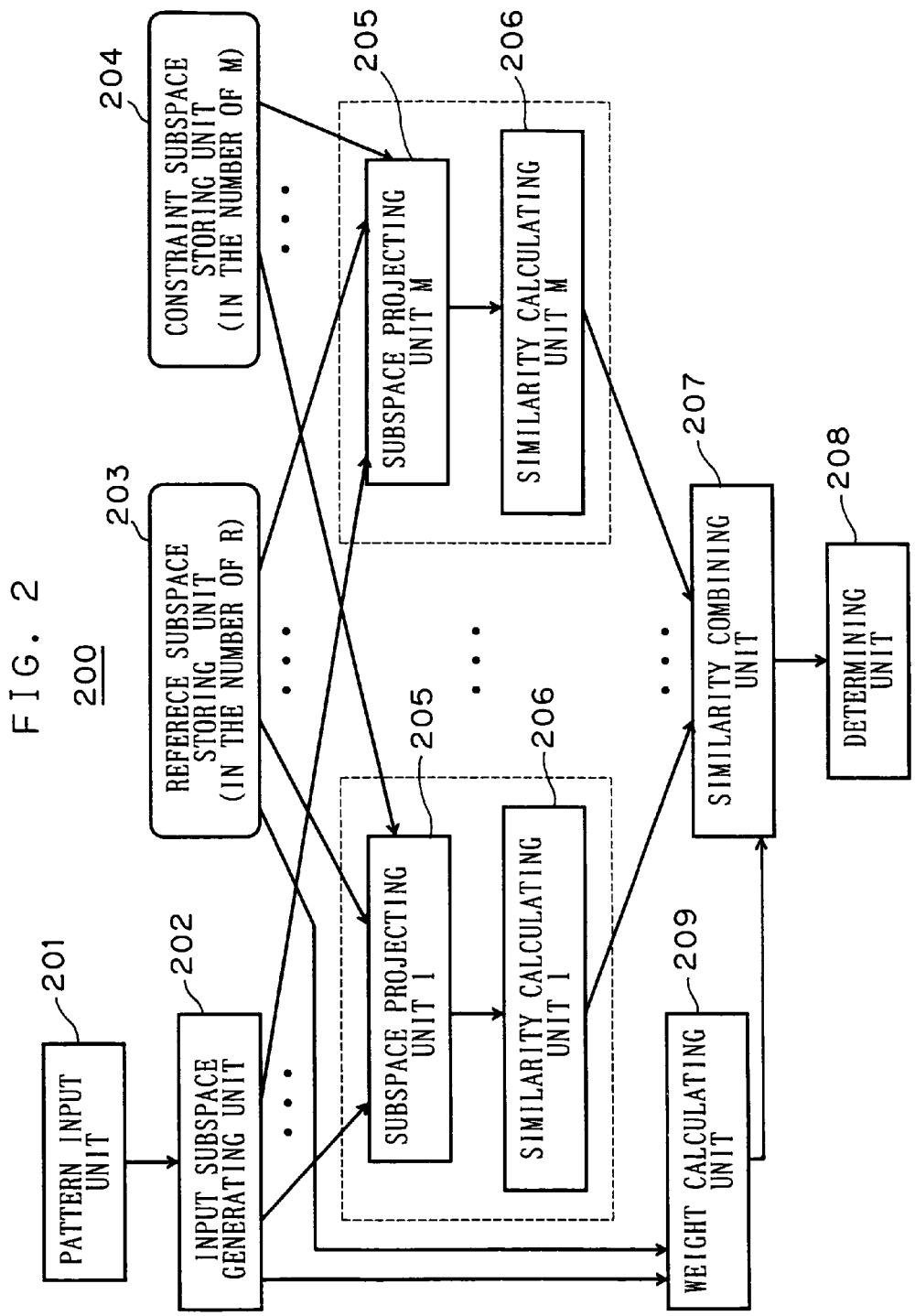
FIG. 2 is a configuration diagram of a pattern recognition apparatus 200.

Now a second embodiment is explained on the basis of FIG. 2.

The first embodiment was on the former of the foregoing similarity combining methods. Now explained is, as a second embodiment, the latter method that combines similarities through a dynamic weight relying upon the input/reference subspaces.

This embodiment is shown as a pattern recognition apparatus 200 in FIG. 2.

The pattern recognition apparatus 200 comprises various units 201-208 functioning similarly to the units 101-108 of the first embodiment, and a weight calculating unit 209. Incidentally, the subspace projecting unit 205 and the similarity calculating unit 206 each exist in the number of M of the constraint subspaces stored in the constraint subspace storing unit 204 similarly to the first embodiment.

The weight calculating unit 209 selects an optimal constraint subspace for the input/reference subspace from a plurality of constraint subspaces, or makes a weighting with an adaptation of the input/reference subspace to the constraint subspace. In this case, the similarity $S_E$ in the similarity combining unit 207 is in a weighed sum, to be determined by Equation (10).

$$S_E = \sum_{1 \leq i \leq M} \omega_i \cos^2 \theta_{C_i} \quad (10)$$

$$\sum_{1 \leq i \leq M} \omega_i = 1 \quad (11)$$

where wi ($1 \leq i \leq M$) represents a weight on each constraint subspace (total sum is assumably 1.0).

As for how to calculate a weight wi in the weight calculating unit 209, it can be considered to use an angle $\theta_{C_{1i}}$ between the input/reference subspace and a subspace $C_{1i}$ defined by the learning patterns for the constraint subspace. This is based on the fact that recognition accuracy increases when the variation of learning patterns and the variation of input/reference patters are similar. The subspace $C_{1i}$ is generated from learning patterns of the constraint subspace $C_1$. In this case, weight wi can be expressed by Equation (12).

$$w_i = \frac{\cos^2 \theta_{C_{1i}}}{\sum_{1 \leq i \leq M} \cos^2 \theta_{C_{1i}}} \quad (12)$$

So far explained is the second embodiment.

Third Embodiment

Figure 3:
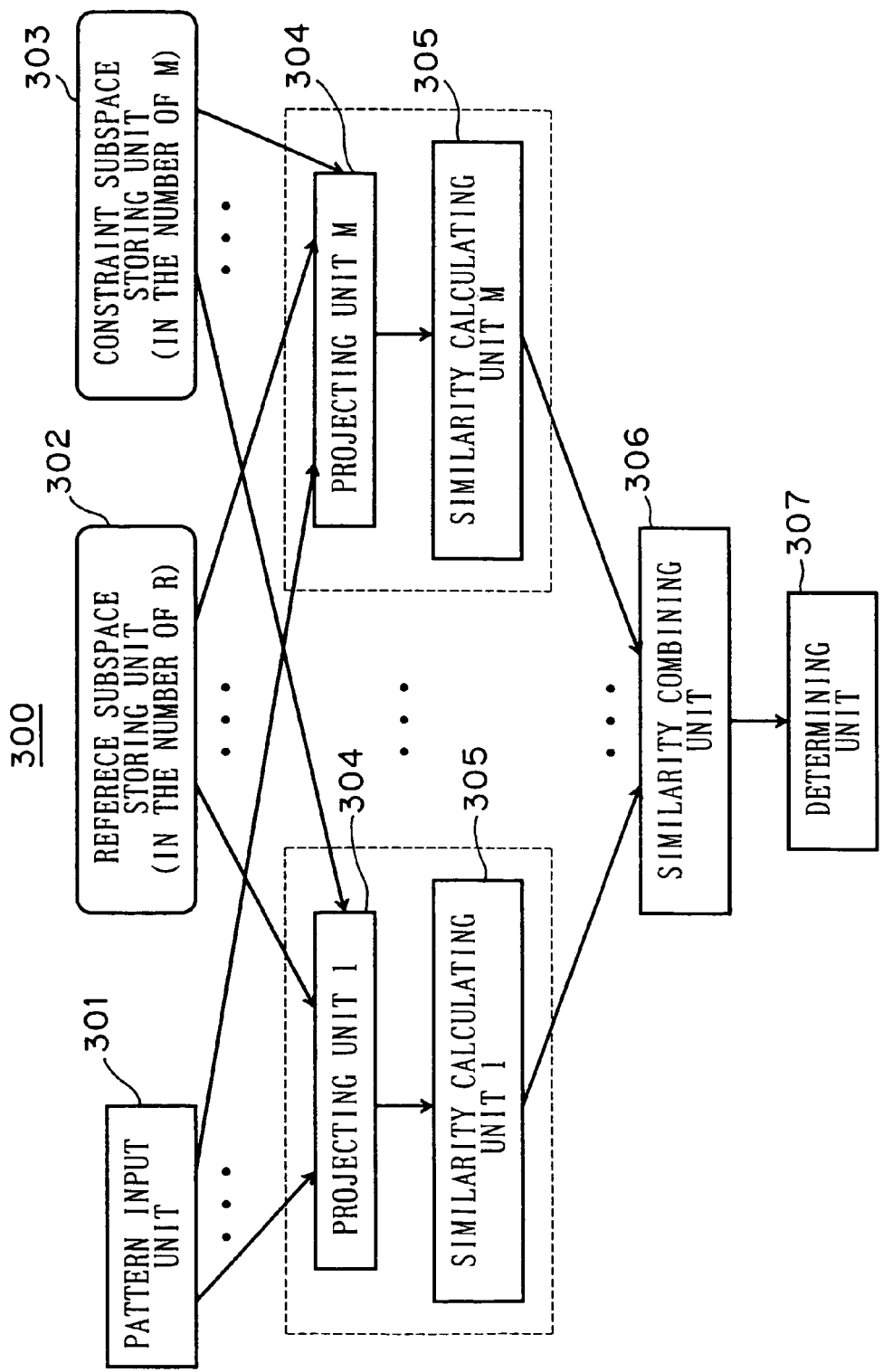
FIG. 3 is a configuration diagram of a pattern recognition apparatus 300.

Now a third embodiment is explained on the basis of FIG. 3.

The similarity calculating unit 106 of the first embodiment, although using the mutual subspace method, can be replaced with a similarity calculating unit using the subspace method. This case is described as a third embodiment.

The present embodiment is shown by a pattern recognition apparatus 300 in FIG. 3. The pattern recognition apparatus 300 comprises a pattern input unit 301, a reference subspace storing unit 302, a constraint subspace storing unit 303, projecting units 304, similarity calculating units 305, a similarity combining unit 306, and a determining unit 307. In the apparatus, number of the projecting units 304 and the number of the similarity calculating units 305 are identical with the number ("M") of the constraint subspaces stored in the constraint subspace storing unit 303.

(1) Pattern Input Unit 301

The pattern input unit 301 has the similar function to the pattern input unit 101 of the first embodiment.

(2) Reference Subspace Storing Unit 302

The reference Subspace Storing Unit 302 has the similar function to the reference Subspace Storing Unit 102 of the first embodiment.

(3) Projecting Units 304

Each of the projecting input vector and units 304 projects the reference subspaces in the number of R stored in the reference subspace storing unit 302, onto one of the constraint subspaces stored in the constraint subspace storing unit 303.

(4) Similarity Calculating Units 305

Each of the similarity calculating units 305 calculates similarities between the input vector and the reference subspace projected onto one of the constraint subspace, by the subspace method.

(5) Similarity Combining Unit 306

The similarity combining unit 306 as the similar function to the determining unit 107 of the first embodiment (6) Determining Unit 307

The determining unit 307 has the similar function to the determining unit 108 of the first embodiment.

Fourth Embodiment

Figure 4:
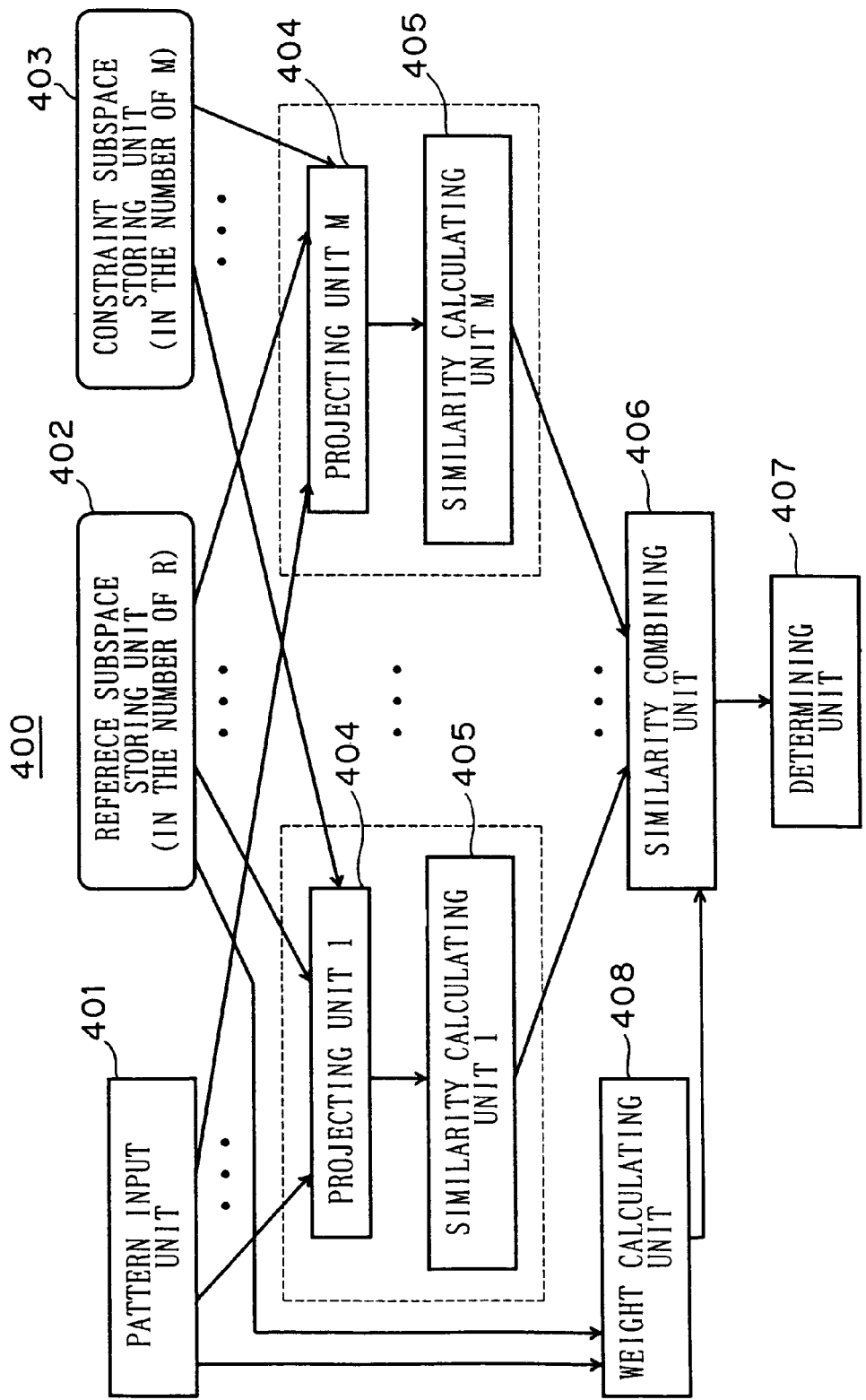
FIG. 4 is a configuration diagram of a pattern recognition apparatus 400.

Now a fourth embodiment is explained on the basis of FIG. 4.

In the second embodiment, replacement is similarly possible with a similarity calculating unit using the subspace method based. This case is explained as a fourth embodiment.

The present embodiment is shown as a pattern recognition apparatus 400 in FIG. 4. The pattern recognition apparatus 400 comprises units 401-407 functioning similarly to the units 301-307 of the third embodiment, and a weight calculating unit 408. In the apparatus, number of the projecting units 404 and the number of the similarity calculating units 405 are identical with the number ("M") of the constraint subspaces stored in the constraint subspace storing unit 403, similarly to the third embodiment.

The weight calculating unit 408 selects an optimal constraint subspace for the input vector or reference subspace from a plurality of constraint subspaces, or makes a weighting with an adaptation of an input vector or reference subspace and constraint subspace.

So far explained is the fourth embodiment.

Incidentally, the pattern recognition apparatus 100, 200, 300, 400 may store a program for realizing the functions on a storage medium of HDD, FDD, CD, DVD, memory or the like, to be invoked onto the computer when carrying out a recognition.

Fifth Embodiment

Figure 5:
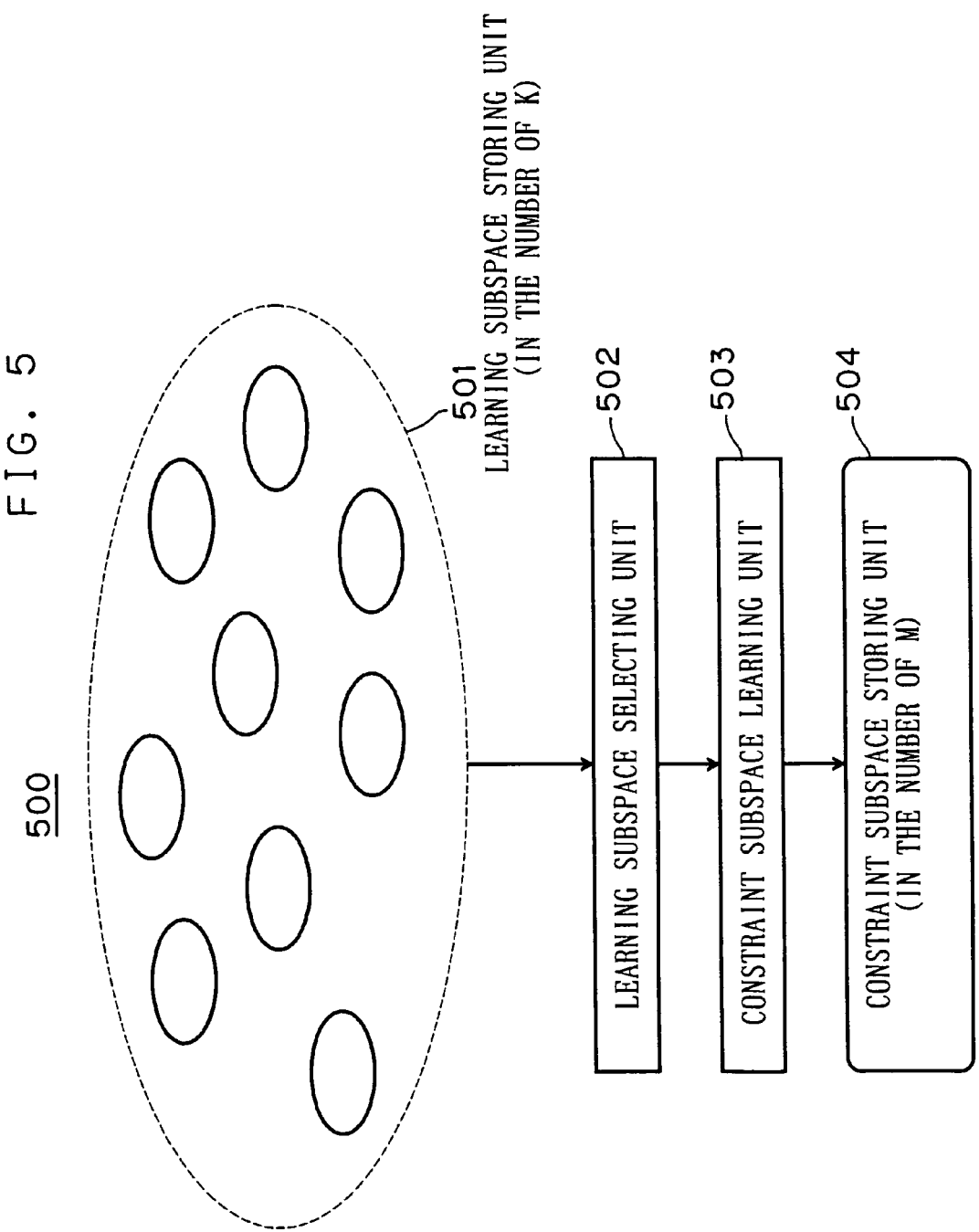
FIG. 5 is a configuration diagram of a constraint subspaces learning device 500.

Now a fifth embodiment is explained on the basis of FIG. 5.

The fifth and sixth embodiments describe means of efficiently leaning a plurality of constraint subspaces from leaning patterns.

H. Aso et al (H. Aso, K. Tsuda, N. Murata, statistics for the pattern recognition and the machine learning, Iwanami Shoten, 2003) describes ensemble learning, including bugging and boosting as a representative method. In bugging, sampling is repeatedly made from learning patterns, to learn a plurality of classifiers, in boosting; the next classifier is generated by giving weights to the mistaken patterns in the previous classifier. The below describes a learning method of constraint subspaces in the framework of ensemble learning.

At first, the fifth embodiment describes an introduction of the bugging framework to learn constraint subspaces.

The present embodiment is shown as constraint subspaces learning apparatus 500 in FIG. 5. The constraint subspaces learning apparatus 500 comprises a learning subspaces storing unit 501, a learning subspace selecting unit 502, a constraint subspace learning unit 503 and a constraint subspace storing unit 504.

(1) Learning Subspace Storing unit 501

The learning subspace storing unit 501 stores learning subspaces in the number of K prepared for ensemble learning. The learning subspaces are generated by a principal component analysis from learning patterns belonging to the category.

(2) Learning Subspace Selecting Unit 502

The learning subspace selecting unit 502 randomly selects learning subspaces in the number of T from the learning subspace storing unit 501. Incidentally, when the learning subspaces of the same category are included among the learning subspaces in the number of T, selection is made once again.

(3) Constraint Subspace Learning Unit 503

The constraint subspace learning unit 503 generates a constraint subspace from the learning subspaces in the number of T, by the method described in JP-A-2000-30065 and Fukui et al cited on p. 2.

(4) Constraint Subspace Storing Unit 504

The learning subspace selecting unit 502 and the constraint subspace learning unit 503 are repeatedly used until constraint subspaces in the number of M are stored to the constraint subspace storing unit 504.

Sixth Embodiment

Figure 6:
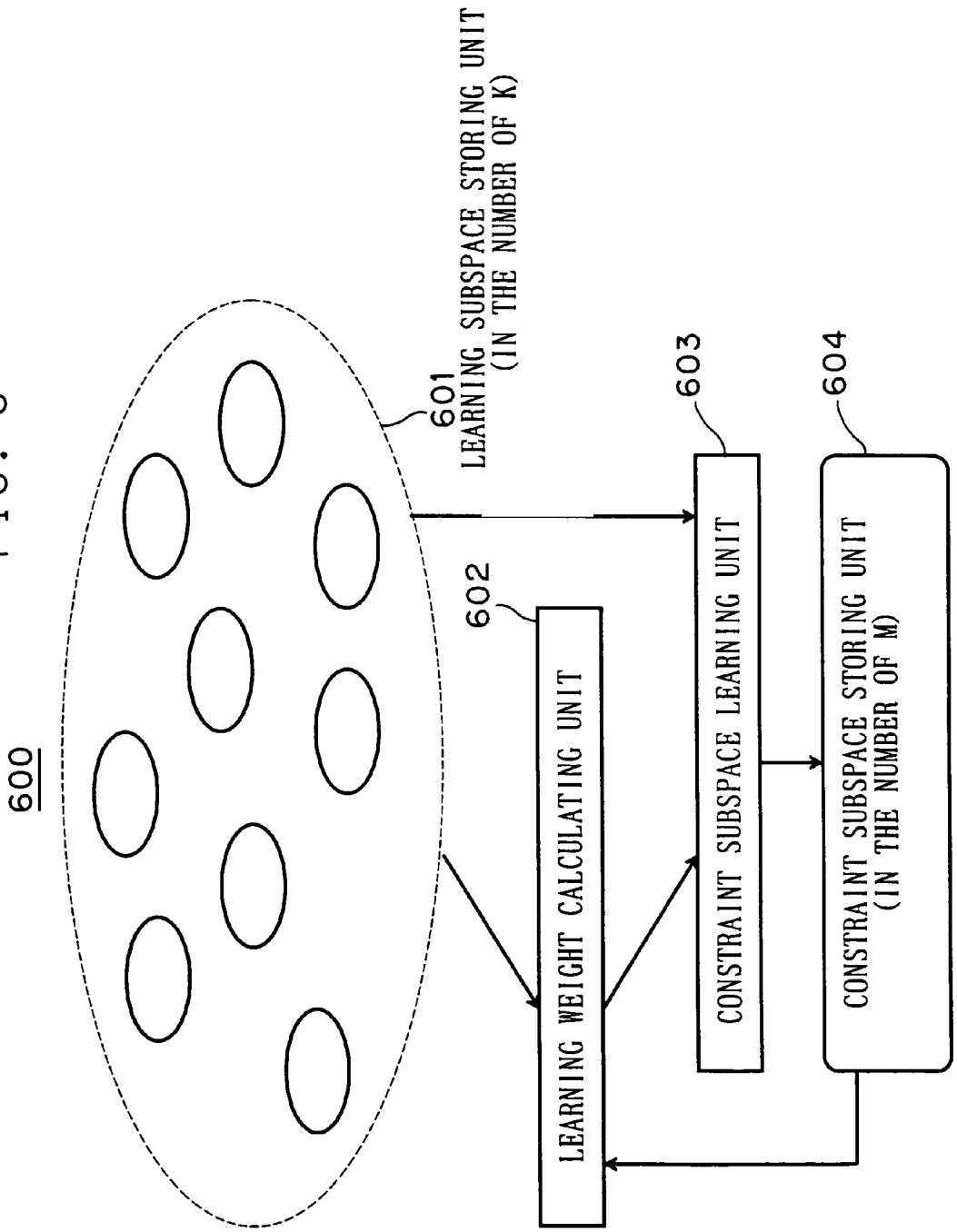
FIG. 6 is a configuration diagram of constraint subspaces learning device 600.

Now a sixth embodiment is explained on the basis of FIG. 6.

The sixth embodiment concerns an introduction of a boosting framework to learn constraint subspaces.

The present embodiment is shown as a constraint subspace learning apparatus 600 in FIG. 6. The constraint subspace learning apparatus 600 comprises a learning subspace storing unit 601, a learning weight calculating unit 602, a constraint subspace learning unit 603 and a constraint subspace storing unit 604.

(1) Learning Subspace Storing Unit 601

The learning subspace storing unit 601 has the same function as the learning subspace storing unit 501.

(2) Learning Weight Calculating Unit 602

The learning weight calculating unit 602 determines a weight $D_t(j)$ of a learning subspace $P_j$, for generating the constraint subspace in the constraint subspace learning unit 603. The newest weight $D_t(j)$ is determined by the following equation, by using the newest constraint subspace $C_{t-1}$ stored in the constraint subspace storing unit 604.

$$D_t(j) = \frac{S'_j}{\sum_{1 \leq j \leq K} S'_j} \tag{13}$$

$$S'_j = \sum_{1 \leq k \leq K, i \neq k} \cos^2 \theta_{C_{t-1}jk} \tag{14}$$

where $\theta c_{t-1jk}$ represents an angle between the learning subspace $P_j$ and $P_k$ after projection onto the constrained subspace $C_{t-1}$. Due to this, the learning subspaces which are similar on the constraint subspace $C_{t-1}$ have an increasing weight. In the next constraint subspace $C_t$, the similar learning subspaces no longer become similar. Equation (14) may be introduced with a condition that a sum is taken from the angle $\theta c_{t-1jk}$ equal to or greater than a definite threshold. Incidentally, the initial weight is assumably given $D_1(j)=1/K$.

(3) Constraint Subspace Learning Unit 603

The constraint subspace learning unit 603 generates the constraint subspace by the method as described in JP-A-2000-30065 and Fukui et al cited on p. 2, after multiplying the weight $D_t(j)$ on basic vector of a learning subspace $P_j$.

(4) Constraint Subspace Storing Unit 604

The learning weight calculating unit 602 and the constraint subspace learning unit 603 are repeatedly used until constraint subspaces in the number M are stored to the constraint subspace storing unit 604.

One of the methods of using the constraint subspaces which are made in the sixth embodiment, similarities are combined through the use of reliability. In this case, the similarity combining unit 107 of the first embodiment uses Equation (15).

$$S_E = \sum_{1 \leq t \leq M} \alpha_t \cos^2 \theta_{C_t} \tag{15}$$

The reliability $\alpha_t$ may be a ratio that the angle $\theta c_{t-1jk}$ of Equation (14) does not exceed a constant threshold. Otherwise, instead of using reliability, similarities may be combined by a method with an average value as described in the similarity combining unit 107.

Detailed Example of the First Embodiment

Figure 7:
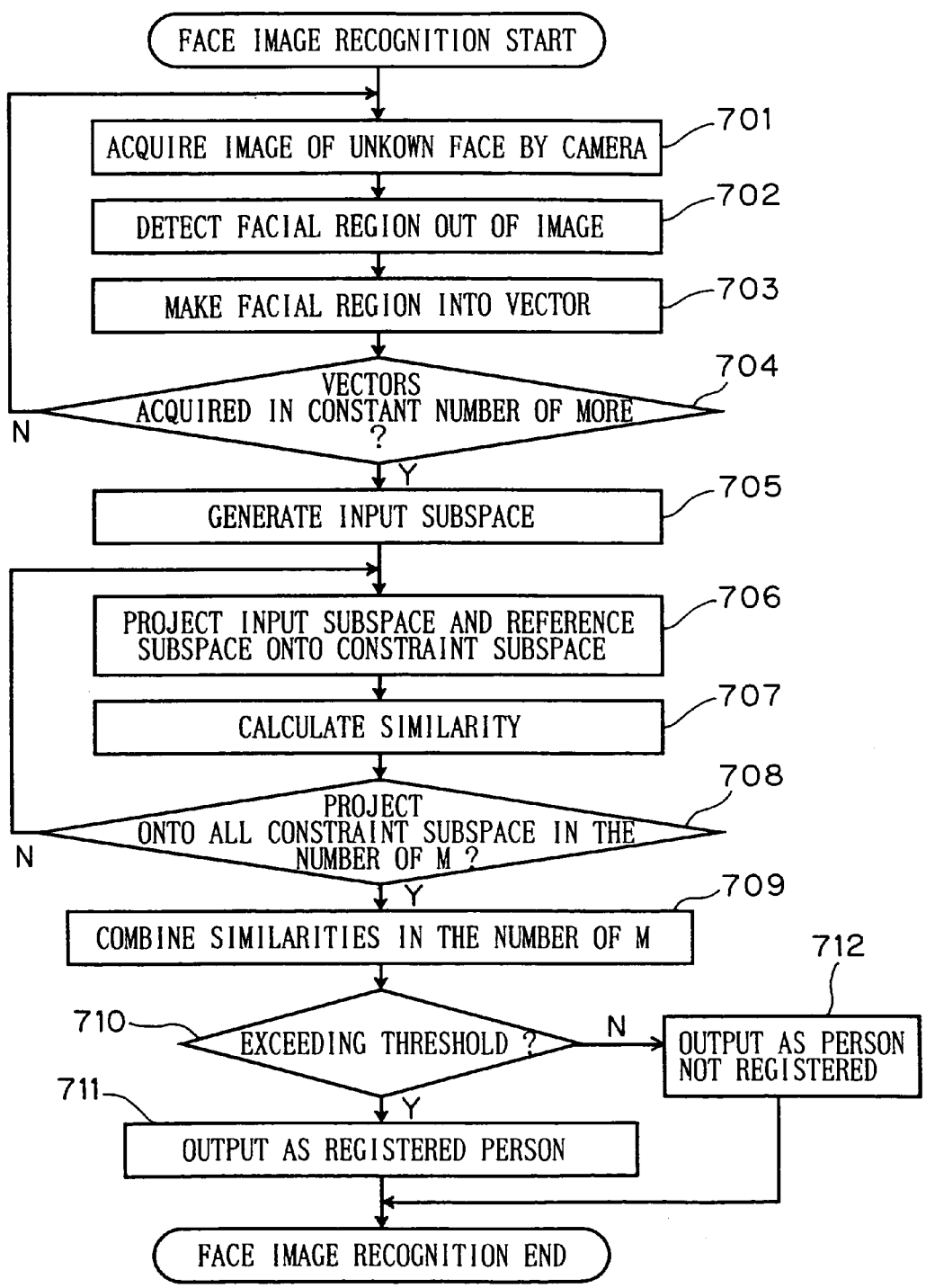
FIG. 7 is a chart showing a flow of face image recognition.
Figure 8:
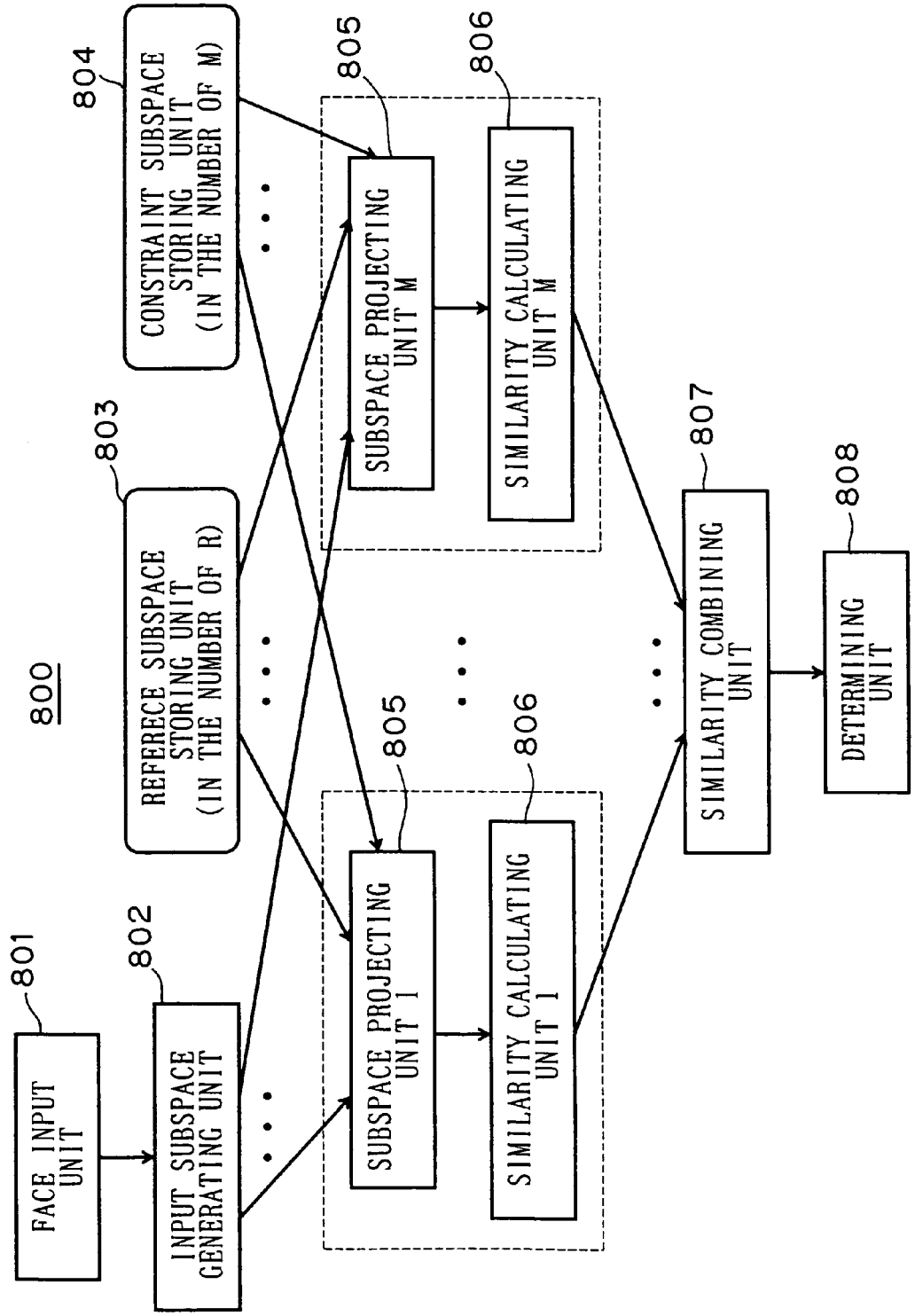
FIG. 8 is a configuration diagram of a face image recognition apparatus 800.

Now explained is pattern recognition using face images, as a detailed example of the first embodiment. The flow of this detailed example is shown in FIG. 7. In FIG. 8 is shown a configuration of the face image recognition apparatus 800.

The face image recognition apparatus 800 comprises a face input unit 801, an input subspace generating unit 802, a reference subspace storing unit 803, a constraint subspace storing unit 804, a subspace projecting unit 805, an similarity calculating unit 806, a similarity combining unit 807, and a face determining unit 808.

(1) Face Input Unit 801

The face input unit 801 acquires a face image by a camera (step 701 in FIG. 7), clips a facial region out of the image (step 702 in FIG. 7), and raster-scans the facial region into a vector (step 703 in FIG. 7).

The facial region can be determined by a positional relationship of facial feature points, such as the pupils and nostrils, as described in JP-A-9 (1997)-251534 and Osamu Yamaguchi et al (Osamu Yamaguchi, Kazuhiro Fukui, "Smartface"—A Robust Face Recognition System under Varying Facial Pose and Expression, IEICE Trans. D-II Vol.

J84-D-II, No. 6, 1045-1052, 2001). Meanwhile, by successively getting face images, facial regions can be obtained at all times.

(2) Input Subspace Generating Unit 802

The input subspace generating unit 802, after getting vectors in the predefined number (step 704 in FIG. 7), determines an input subspace by the principal component analysis (705 in FIG. 7).

(3) Reference Subspace Storing Unit 803

The reference subspace storing unit 803 is stored with reference subspaces in the number of R.

(4) Constraint Subspace Storing Unit 804

The constraint subspace storing unit 804 is stored with constraint subspaces in the number of M. In order to improve recognition performance, constraint subspaces are generated taking into consideration the followings.

The cause of the performance decline includes the variation in appearance due to lighting, ornaments and the like. In order to provide a resistance to lighting variation, learning patterns require face images taken by changing the lighting conditions.

Meanwhile, in order to provide a resistance to the variation due to the ornaments (glasses) worn on the face, learning patterns require face images taken by changing the ornament.

Figure 9:
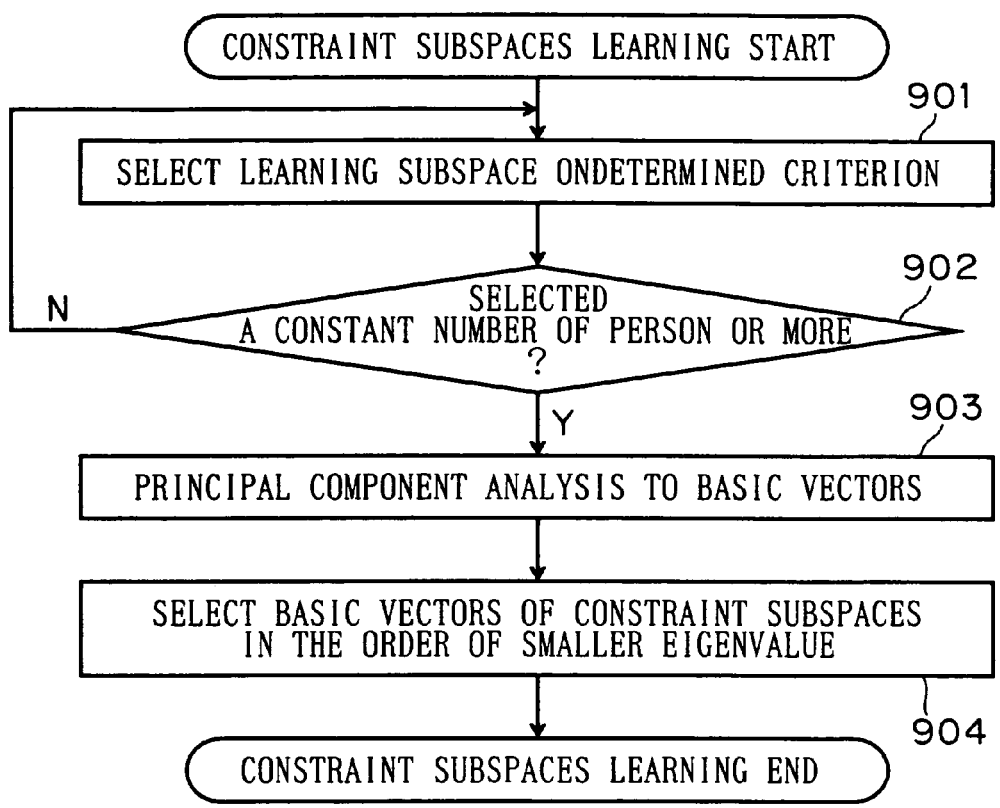
FIG. 9 is a chart showing a learning flow of constraint subspaces.

FIG. 9 shows a flow of learning constraint subspaces.

At first, prepared are learning subspaces generated by learning patterns which are acquired in various lighting conditions and ornaments conditions. From those, selected are learning subspaces of the persons satisfying the defined criterion (e.g. wearing glasses) (step 901 in FIG. 9).

After selecting learning subspaces of a constant number of persons (step 902 in FIG. 9), the basic vectors of the learning subspaces are taken as an input to principal component analysis (step 903 in FIG. 9).

The eigenvectors, obtained as a result of the principal component analysis, are selected in ascending order of the eigenvalue to get the basic vectors of constraint subspace (step 904 in FIG. 9).

(5) Subspace Projecting Unit 805

The subspace projecting unit 805 projects the input subspace and the reference subspaces of the R persons stored in the reference subspace storing unit 803, onto one of the constraint subspaces stored in the constraint subspace storing unit 804 (step 706 in FIG. 7).

The procedure of projection may use a method described in JP-A-2000-30065 and Fukui et al cited on p.2.

(6) Similarity Calculating Unit 806

The similarity calculating unit 806 calculates the similarities between the reference subspace and input subspace projected onto one constraint subspace by the mutual subspace method (step 707 in FIG. 7).

The subspace projecting unit 805 and the similarity calculating unit 806 exist in the number of M to carry out parallel.

Otherwise, a subspace projecting unit 805 and a similarity calculating unit 806 are repetitively used sequentially by the number M of constraint subspaces (step 708 in FIG. 7).

(7) Similarity Combining Unit 807

The similarity combining unit 807 combines the similarities by the method described in the similarity combining unit 107 (step 709 in FIG. 7). Incidentally, combining the similarities is carried out by the number R of the reference subspaces stored in the reference subspace storing unit 803.

(8) Face Determining Unit 808

The face determining unit 808 determines the person of the input subspace from the combined similarity which is the highest value and greater than a preset threshold. In other cases, output is as a person not registered in the reference subspace storing unit. Output is by notification on screen or by sound with using a monitor or speaker.

(9) Outline

The above (1) to (8) is outlined.

At first, reference subspaces in the number of R are previously prepared. These are reference subspaces G1, G2, . . . , GR made from the facial regions in the number of R persons.

Meanwhile, the constraint subspace includes constraint subspaces S1, S2, . . . , SM in the number of M, e.g. constraint subspaces that glasses are worn and constraint subspaces that lighting is applied.

Here, inputted is a facial region of the person X to make an input subspace on X.

Then, the input subspace on X and reference subspace G1 are projected on to a constraint subspace S1, to thereby determine a similarity B1-1.

Next, the input subspace on X and the reference subspace G1 are projected onto a constraint subspace S2, to thereby determine a similarity B2-1.

Subsequently, similarities B1-1, B2-1, . . . , BM-1, BM-2, . . . , BR-M are determined in the similar manner. Namely, determined are similarities in the number of M×R.

Then, a combined similarity is determined on each reference subspace. Namely, the similarities B1-1, B2-1, . . . , BM-1 are combined together, to determine a combined similarity J1 between the input subspace on X and the reference subspace G1. Also, determined is a combined similarity J2 between the input subspace on X and the reference subspace G2. Subsequently, combined similarities J3, . . . , JR are determined in the similar manner.

Then, the reference subspace, having a combined similarity highest in the combined similarities J1, . . . , JR in the number of R and its value is greater than a preset threshold, provides the corresponding person.

(9) Modification Taking Account of Reducing the Amount of Calculation

In the case of sequentially calculating similarities by using a plurality of constraint subspaces, there is increase in calculation time. In order to reduce the amount of calculation, it is possible to narrow down the persons who are calculated similarities. There is shown in FIG. 10 a flow of face image recognition taking account of reducing the amount of calculation.

Figure 10:
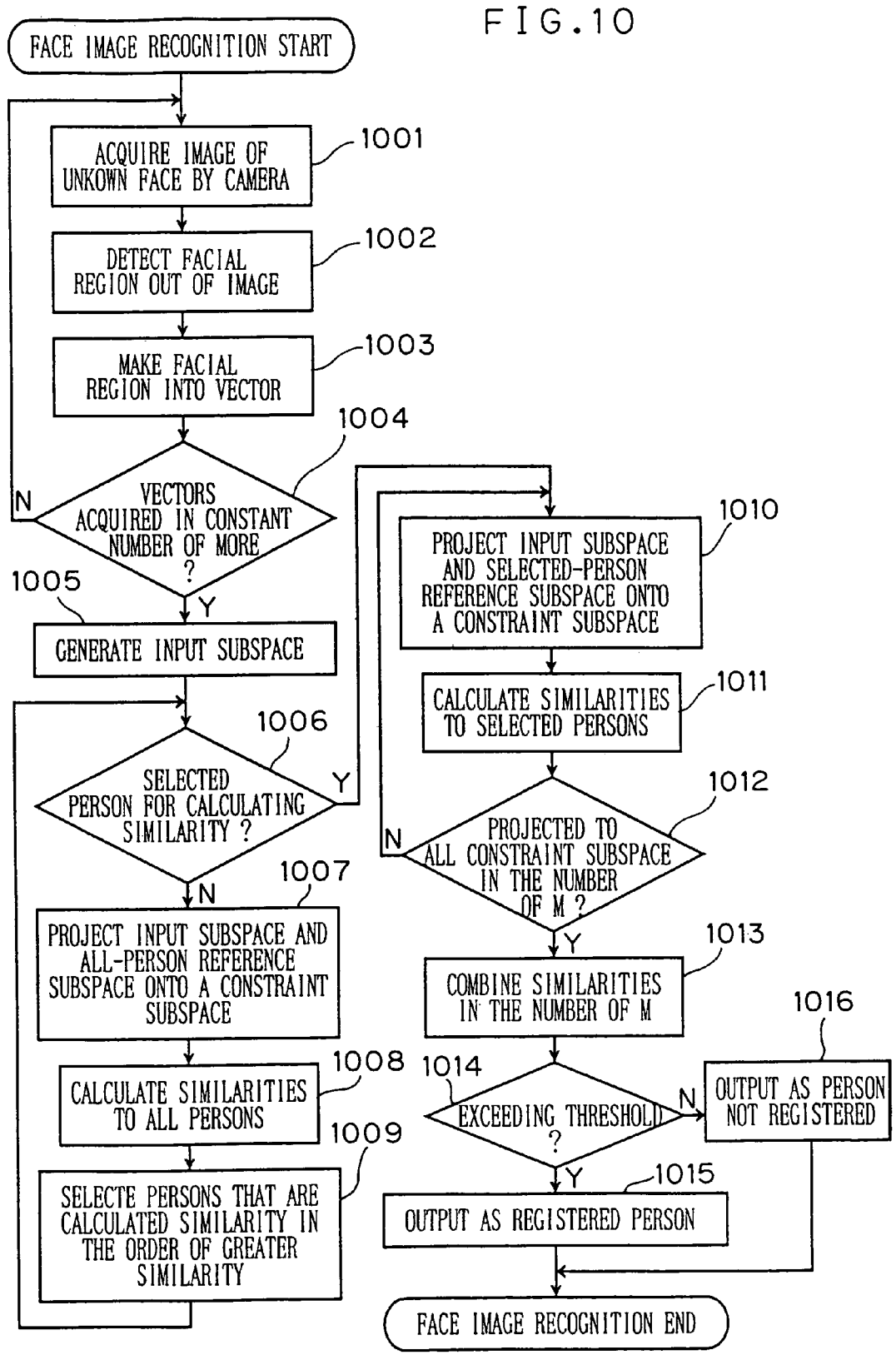
FIG. 10 is a chart showing a flow of face image recognition taking account of reducing calculation time.

At first, the input subspace and reference subspaces are projected onto one of the constraint subspaces in the number of M (step 1007 in FIG. 10). Second, similarities are calculated by the mutual subspace method (step 1008 in FIG. 10). Selected are the persons in the number of X (X<R) in descending order of the similarity (step 1009 in FIG. 10). R represents the number of the registered persons. Only on those persons, similarities are calculated by using the remaining constraint subspaces in the number of M-1 (steps 1010-1011 in FIG. 10).

The face image recognition is true for the second to fourth embodiments, similarly.

Detailed Example of the Fifth Embodiment

Figure 11:
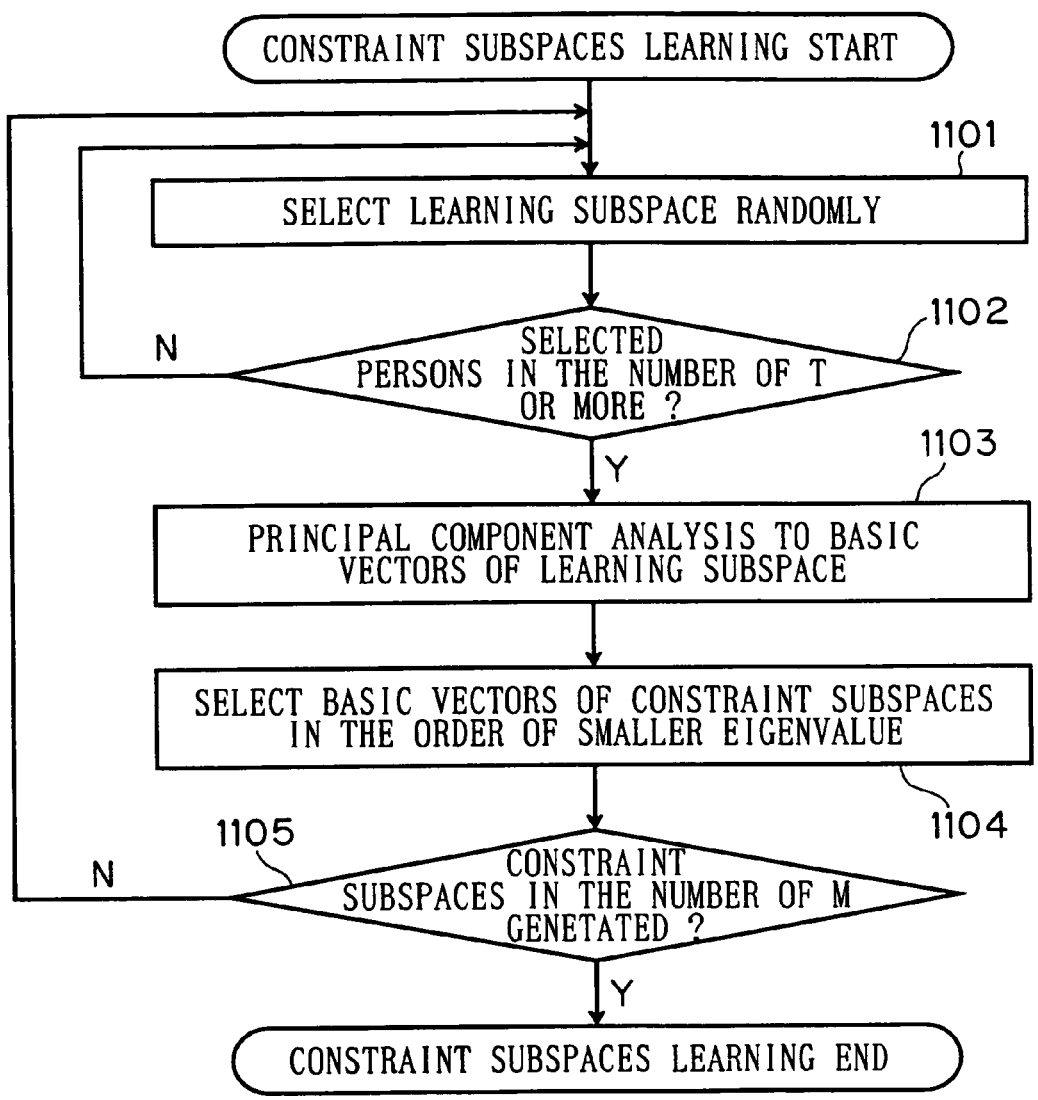
FIG. 11 is a chart showing a learning flow of constraint subspaces based on ensemble learning.

Now, one of the learning methods of constraint subspaces is explained to be used in face image recognition, as a detailed example of the fifth embodiment. There is shown in FIG. 11 a flow of this detailed example while in FIG. 12 a configuration of a constraint subspace learning apparatus 1200.

The constraint subspace learning apparatus 1200 comprises a learning subspace storing unit 1201, a learning subspace selecting unit 1202, a constraint subspace learning unit 1203 and a constraint subspace storing unit 1204.

(1) Learning Subspace Storing Unit 1201

The learning subspace storing unit 1201 stores learning subspaces in the number of K. The learning subspaces generated from face images taken by varying lighting conditions or wearing ornaments, such as glasses.

(2) Learning Subspace Selecting Unit 1202

The learning subspace selecting unit 1202 randomly selects a learning subspace from the learning subspace storing unit 1201 (step 1101 in FIG. 11). This is repeated until persons in the number of T (T<K) are selected (step 1102 in FIG. 11). If thus selected ones of the learning subspaces in number of T include two or more of those for same person, selection should be made anew.

(3) Constraint Subspace Learning Unit 1203

The constraint subspace learning unit 1203 generates a constraint subspace by the principal component analysis from the basic vectors of selected learning subspaces (step 1103 in FIG. 11). The eigenvectors obtained as a result of the principal component analysis are selected in ascending order of the eigenvalue and taken as the basis vectors of constraint subspace (step 1104 in FIG. 11).

(4) Constraint Subspace Storing Unit 1204

Until constraint subspaces in the number of M are stored to the constraint subspace storing unit 1204, the learning subspace selecting unit 1202 and constraint subspace learning unit 1203 are used repeatedly (step 1105 in FIG. 11).

Learning constraint subspaces using a face image is true for the sixth embodiment.

Modification

Whereas face images of persons are used as input patterns in the above embodiments, fingerprints, voice, letters, DNA or the like may be used if identification of is feasible.

What is claimed is:

1. A pattern recognition apparatus comprising:
   an input unit configured to input at least one input pattern;
   an input subspace generating unit configured to generate an input subspace by generating an input vector from said input pattern and analyzing a main component for said input vector;
   a reference subspace calculating unit configured to calculate a reference subspace, respectively, by analyzing a main component for a reference pattern relevant to a plurality of comparison targets to compare them with said recognition target;
   a constraint subspace storing unit configured to obtain a subspace for learning obtained by a main component analysis from a pattern including a variation resulting in declining pattern recognition performance and storing a plurality of constraint subspaces obtained from said subspace for learning;
   a projecting unit configured to project said input subspace and said plurality of reference subspaces onto each one of said plurality of constraint subspaces;
   a similarity calculating unit configured to calculate similarities between said input subspace in the projected constraint subspaces and all of said plurality of reference subspaces, individually;
   a similarity combining unit configured to combine the similarities of said plurality of constraint spaces for each reference subspace and calculating a combined similarity for each reference subspace; and
   a determining unit configured to determine a comparison target of the reference subspace corresponding to a combined similarity having a high value among said combined similarities as said recognition target.

2. The pattern recognition apparatus according to claim 1, wherein said similarity calculating unit calculates canonical angles, as angles defined between the input subspace and the reference subspaces in each of the constraint subspaces that are projected by the projecting unit; and
   each of the calculated canonical angles is defined to be a similarity between said input subspace and said reference subspace.

3. The pattern recognition apparatus according to claim 1, wherein said constraint subspace storing unit comprises a subspace for learning unit for storing a plurality of said subspaces for learning; and a constraint subspace learning unit for ensemble-learning a necessary number of constraint subspaces from among said plurality of said subspaces for learning.

4. The pattern recognition apparatus according to claim 2, wherein said constraint subspace storing unit comprises a subspace for learning unit for storing a plurality of said subspaces for learning; and a constraint subspace learning unit for ensemble-learning a necessary number of constraint subspaces from among said plurality of said subspaces for learning.

5. A pattern recognition apparatus comprising:
   an input unit configured to input at least one input pattern;
   an input vector generating unit configured to generate an input vector from said input pattern;
   a reference subspace calculating unit configured to calculate a reference subspace, respectively, by analyzing a main component for a reference pattern relevant to a plurality of comparison targets to compare them with said recognition target;
   a constraint subspace storing unit configured to obtain a subspace for learning obtained by a main component analysis from a pattern including a variation resulting in declining pattern recognition performance and storing constraint subspaces obtained from said subspace for learning;
   a projecting unit configured to project said input vector and said plurality of reference subspaces onto each one of said plurality of constraint subspaces;
   a similarity calculating unit configured to calculate similarities between the input vector in said projected constraint subspaces and all of said plurality of reference subspaces, individually;
   a similarity combining unit configured to combine the similarities of said plurality of constraint spaces for each reference subspace and calculating a combined similarity for each reference subspace; and
   a determining unit configured to determine a comparison target of the reference subspace corresponding to a combined similarity having a high value among said combined similarities as said recognition target.

6. The pattern recognition apparatus according to claim 5, wherein said similarity calculating unit calculates canonical angles, as angles defined between said input vector and said reference subspaces in each of the constraint subspaces that are projected by said projecting unit; and
   each of the calculated canonical angles is defined to be a similarity between said input vector and said reference subspace.

7. The pattern recognition apparatus according to claim 5, wherein said constraint subspace storing unit comprises a subspace for learning unit for storing a plurality of said subspaces for learning; and a constraint subspace learning unit for ensemble-learning a necessary number of constraint subspaces from among said plurality of said subspaces for learning.

8. The pattern recognition apparatus according to claim 6, wherein said constraint subspace storing unit comprises a subspace for learning unit for storing a plurality of said subspaces for learning; and a constraint subspace learning unit for ensemble-learning a necessary number of constraint subspaces from among said plurality of said subspaces for learning.

9. A pattern recognition method comprising:
an input step of inputting at least one input pattern;
an input subspace generating step for generating an input subspace by generating an input vector from said input pattern and analyzing a main component for said input vector;
a reference subspace calculating step of calculating a reference subspace, respectively, by analyzing a main component for a reference pattern relevant to a plurality of comparison targets to compare them with said recognition target;
a constraint subspace storing step of obtaining a subspace for learning obtained by a main component analysis from a pattern including a variation resulting in declining pattern recognition performance and storing a plurality of constraint subspaces obtained from said subspace for learning;
a projecting step of projecting said input subspace and said plurality of reference subspaces onto each one of said plurality of constraint subspaces; a similarity calculating step of calculating similarities between said input subspace in the projected constraint subspaces and all of said plurality of reference subspaces, individually;
a similarity combining step of combining the similarities of said plurality of constraint spaces for each reference subspace and calculating a combined similarity for each reference subspace; and
a determining step of determining a comparison target of the reference subspace corresponding to a combined similarity having a high value among said combined similarities as said recognition target.

10. The pattern recognition method according to claim 9, wherein said similarity calculating step calculates canonical angles, as angles defined between the input subspace and the reference subspaces in each of the constraint subspaces that are projected by the projecting step; and
each of the calculated canonical angles is defined to be a similarity between aid input subspace and said reference subspace.

11. the pattern recognition method according to claim 9, wherein said constraint subspace storing step comprises a subspace for learning step for storing a plurality of said subspaces for learning; and a constraint subspace learning step for ensemble-learning a necessary number of constraint subspaces form among said plurality of said subspace for learning.

12. the pattern recognition method according to claim 10, wherein said constraint subspace storing step comprises a subspace for learning step for storing a plurality of said subspaces for learning; and a constraint subspace learning step for ensemble-learning a necessary number of constraint subspaces form among said plurality of said subspace for learning.

13. A pattern recognition method comprising:
an input step of inputting at least one input pattern;
an input vector generating step of generating an input vector from said input pattern; a reference subspace calculating step of calculating a reference subspace, respectively, by analyzing a main component for a reference pattern relevant to a plurality of comparison targets to compare them with said recognition target;
a constraint subspace storing step of obtaining a subspace for learning obtained by a main component analysis from a pattern including a variation resulting in declining pattern recognition performance and storing constraint subspaces obtained from said subspace for learning;
a projecting step of projecting said input vector and said plurality of reference subspaces onto each one of said plurality of constraint subspaces;
a similarity calculating step of calculating similarities between the input vector in said projected constraint subspaces and all of said plurality of reference subspaces, individually;
a similarity combining step of combining the similarities of said plurality of constraint spaces for each reference subspace and calculating a combined similarity for each reference subspace; and
a determining step of determining a comparison target of the reference subspace corresponding to a combined similarity having a high value among said combined similarities as said recognition target.

14. The pattern recognition method according to claim 13, wherein said similarity calculating step calculates canonical angles, as angles defined between said input vector and said reference subspaces in each of the constraint subspaces that are projected by said projecting step; and
each of the calculated canonical angles is defined to be a similarity between said input vector and said reference subspace.

15. the pattern recognition method according to claim 13, wherein said constraint subspace storing step comprises a subspace for learning step for storing a plurality of said subspaces for learning; and a constraint subspace learning step for ensemble-learning a necessary number of constraint subspaces form among said plurality of said subspace for learning.

16. the pattern recognition method according to claim 14, wherein said constraint subspace storing step comprises a subspace for learning step for storing a plurality of said subspaces for learning; and a constraint subspace learning step for ensemble-learning a necessary number of constraint subspaces form among said plurality of said subspace for learning.

17. A computer readable recording medium for storing a program for a pattern recognition method for causing a computer to implement:
an input function of inputting at least one input pattern;
an input subspace generating function of generating an input subspace by generating an input vector from said input pattern and analyzing a main component for said input vector;
a reference subspace calculating step of calculating a reference subspace, respectively, by analyzing a main component for a reference pattern relevant to a plurality of comparison targets to compare them with said recognition target;
a constraint subspace storing function of obtaining a subspace for learning obtained by a main component analysis from a pattern including a variation resulting in declining pattern recognition performance and storing a plurality of constraint subspaces obtained from said subspace for learning;
a projecting function of projecting said input subspace and said plurality of reference subspaces onto each one of said plurality of constraint subspaces;

a similarity calculating function of calculating similarities between said input subspace in the projected constraint subspaces and all of said plurality of reference subspaces, individually;

a similarity combining function of combining the similarities of said plurality of constraint spaces for each reference subspace and calculating a combined similarity for each reference subspace; and a determining function of determining that a comparison target of the reference subspace corresponding to a combined similarity having a high value among said combined similarities as said recognition target.

18. A computer readable recording medium for storing a program for a pattern recognition method for causing a computer to implement:

an input function of inputting at least one input pattern;

an input vector generating function of generating an input vector from said input pattern;

a reference subspace calculating function of calculating a reference subspace, respectively, by analyzing a main component for a reference pattern relevant to a plurality of comparison targets to compare them with said recognition target;

a constraint subspace storing function of obtaining a subspace for learning obtained by a main component analysis from a pattern including a variation resulting in declining pattern recognition performance and storing a plurality of constraint subspaces obtained from said subspace for learning;

a projecting function of projecting said input vector and said plurality of reference subspaces onto each one of said plurality of constraint subspaces;

a similarity calculating function of calculating similarities between the input vector in said projected constraint subspaces and all of said plurality of reference subspaces, individually;

a similarity combining function of combining the similarities of said plurality of constraint spaces for each reference subspace and calculating a combined similarity for each reference subspace; and a determining function of determining that a comparison target of the reference subspace corresponding to a combined similarity having a high value among said combined similarities as said recognition target.

\* \* \* \* \*